Patented Sept. 11, 1928.

1,683,681

UNITED STATES PATENT OFFICE.

LEON LILIENFELD, OF VIENNA, AUSTRIA.

MAKING CELLULOSE ETHERS AND ALKALI CELLULOSE.

No Drawing. Application filed June 16, 1923, Serial No. 645,911, and in Austria July 13, 1922.

Anhydrous or low water content alkali celluloses are required for many purposes and especially for alkylating and aralkylating cellulose.

In the present specification and claims, the expression "low water content alkali cellulose" is used, as in the prior art, to distinguish alkali cellulose in which the water content is substantially below one half the combined content of alkali and cellulose.

These low water content or anhydrous alkali celluloses have been prepared, either (a) by drying alkali cellulose, or (b) by impregnating cellulose with alkali solution, pressing and incorporating solid caustic alkali, or finally (c) by kneading cellulose with solid caustic alkali or a mixture of solid caustic alkali and a saturated solution of alkali.

The first method has the disadvantage that when it is used with alkali celluloses which contain a large quantity of caustic alkali, (such as are used in the manufacture of highly etherified cellulose ethers in one or two operations), the cellulose molecule undergoes an undesirable transformation, (probably depolymerization), and the ethers made by alkylating or aralkylating such alkali celluloses give more or less brittle films when their solutions are evaporated.

The second method has the disadvantage that there is a lower limit of water content below which the cellulose cannot be deprived of the excess caustic soda solution or water by means of pressing or centrifuging.

The third method is not always practicable where the quantity of alkali to be incorporated is not unnecessarily large as it is extremely difficult to secure an even mixture of the caustic alkali however finely divided it may be, with the fluffy, voluminous cellulose even in the best machines and with the best processes.

The present invention is based on my discovery that it is possible to prepare alkali celluloses of low water content and containing any desired amount of caustic alkali by the following process which leaves the cellulose molecule practically intact and hence permits good yields of cellulose ethers by single stage or multi-stage etherification, which ethers form solution that dry to clear, flexible films.

Alkali cellulose of not too great alkali content is dried until it is anhydrous or until the water content is low and it is then treated with caustic alkalies in the dry state or only slightly moistened. In this way just the right quantity of caustic alkali can be added. Since the drying takes place in the presence of moderate or very small quantities of caustic alkali, the cellulose molecule does not tend to depolymerize and this effect can be avoided during the incorporation of the solid caustic alkali if the proper precautions are taken, that is if the solid alkali is mixed or kneaded in small portions or with cooling or both. Alkali celluloses of varying caustic alkali content can be prepared depending on the alkali content of the dried alkali cellulose and the amount of solid caustic alkali incorporated with it. Hence it is possible to prepare by this process not only alkali celluloses with a caustic alkali content sufficient to give a highly etherified cellulose ether in one operation, but also alkali celluloses with a caustic alkali content only just sufficient to give a lower ether when treated with alkylating or aralkylating agents which can then be transformed into an ether of a higher degree of etherification in one or more additional stages.

The following materials can be used in this process; cellulose in all forms, materials containing cellulose suitable conversion products of cellulose such as cellulose hydrates which are not too much depolymerized, (as for example artificial silk waste or cellulose hydrates made by precipitating viscose with acids and then washing and drying if desired, or by heating or long storage of viscose followed by washing and drying, or by precipitating cuprammonium cellulose followed by washing and drying), or a suitable cellulose derivative such as that precipitated from viscose by treatment with alcohol or salt or by heating and subsequent washing and drying. In the remainder of the description and claims the term "cellulosic material" will cover not only cellulose itself but also the conversion products and derivatives mentioned above. The raw material is impregnated with alkali solution until it has the desired water content. The impregnation of the cellulose with alkali solution may be carried out for example by mixing the cellulose with the desired amount of alkali solution of the required concentration or excess alkali solution may be used and after standing for a longer or shorter time the excess may be removed by pressing, centrifuging, suction filtration or the like until the residue contains only a moderate amount of alkali which is not sufficient to cause enough depolymerization of the cellulose to injuriously affect the final product.

Alkali celluloses made by the above methods may be dried at once or after storage either at room temperature or with cooling until they contain the desired water content or less. The drying may be in a vacuum, in an atmosphere of inert gas or in a stream of air (preferably dry) which does not have too high a percentage of carbon dioxide. The dried alkali cellulose which may feel quite dry or slightly moist depending on the amount of water remaining, is placed in powerful mixing machines such as disintegrators, kneading machines, shredding machines, edge runners or the like, and is mixed with solid caustic alkali preferably with cooling, until it is entirely homogeneous.

If the solid caustic alkali is incorporated with free exposure to the outside air, the mixture usually tends to absorb moisture to a greater or less extent. It is necessary in every case to calculate the amount of drying so that the water content after the increase absorbed from the air during the step of mixing the solid caustic alkali will correspond to the amount desired. It is also possible to carry out the incorporation of solid caustic alkali in the absence of moist air for example in tightly closed kneading machines, disintegrators or the like, in which case the drying of the alkali cellulose should proceed until the exact degree of moisture desired is reached. Another modification consists in drying the alkali cellulose to complete dryness or to a lower water content than is desired and then mixing or kneading in a mixture of solid caustic alkali and saturated caustic alkali solution, instead of using solid caustic alkali alone. The alkali cellulose prepared by this method can be alkylated or aralkylated at once or it can be stored as long as desired. If desired the product may be comminuted in a suitable machine, (shredder, willowing machine, disintegrator, mill, edge runner, etc.,) before it is etherified.

The dried alkali cellulose can be treated with sufficient alkylating or aralkylating agents to give a higher ether in one operation, or a lower ether can be formed first and then further etherified with additional quantities of etherifying agents, the process depending on the amount of alkali in the alkali cellulose.

The etherification proceeds in the usual way whether the alkali cellulose is to be transformed into an intermediate product and then further etherified to a higher cellulose ether or whether it is to be fully etherified in a single operation. The process as usual consists in treating the material with alkylating or aralkylating agents, (for example alkyl or aralkyl esters of inorganic acids), in one or more stages. Naturally when low boiling alkylating agents are used, such as ethyl chloride, ethyl bromide, etc., an autoclave is necessary whereas the higher boiling etherifying agents, such as for instance dialkyl sulfates, benzyl chloride, ethyl iodide, etc., permit the use of open vessels or vessels provided with reflux condensers. The alkylating and aralkylating agents are calculated on the amount of alkali but a smaller quantity may be used or an excess, in the latter case however the temperatures should not rise too high.

The reaction temperatures and times depend in general on the alkylating or aralkylating agent used. For example ethyl chloride requires in general heating from 4 to 24 hours at 90 to 150° C., while with diethyl sulfate heating from 1 to 5 hours at a temperature of 40 to 80° C., suffices. Any excess of alkylating or aralkylating agents or volatile byproducts, (alcohol or ether), may be recovered by distillation either during or after the reaction.

The separation of the finished cellulose ether of a high stage of etherification follows the usual practice, that is the reaction mixture is mixed with water if necessary and filtered and the cellulose ether thoroughly washed with cold or hot water and dried. The procedure may be modified by treating the mass with a dilute acid either before or after a first washing, and then following this treatment with a second washing and drying.

The practical advance represented by the present process lies in the fact that dried alkali cellulose with a comparatively small alkali content mixes with solid caustic alkali much better (i. e., more easily and more completely) than does cellulose itself. This results in a much more even and more reliable product than when solid caustic alkali is directly mixed with cellulose itself. This homogeneity makes the material readily accessible to the alkylating or aralkylating agents during the reaction so that fiber-free cellulose ethers can be produced by this process with a smaller quantity of alkylating or aralkylating agents and these ethers are very homogeneous and so highly alkylated that their solutions give clear, water-resistant films. Alkali celluloses containing the whole of the alkali required for etherification or a major part of it, when made by the present process show the advantage that the highly etherified cellulose ethers made from them have a less depolymerized cellulose molecule and hence give more flexible products. In the following examples and throughout the specification, the "parts" are by weight.

*Examples.*

I.

100 parts of sulfite cellulose are impregnated with 900 to 1000 parts of 15 to 18% sodium hydroxide solution and allowed to stand for 24 to 72 hours. The mass is then pressed to a weight of 200 to 250 parts and comminuted in a disintegrator. The material may stand for 2 to 3 days or may be dried at once in a vacuum at room temperature to constant weight. The final weight is about 120 to 130 parts. The water content tests about 1 to 5% at 100 to 105° C. 100 to 125 parts of powdered sodium hydroxide are slowly kneaded into the dried alkali cellulose in a suitable machine, (kneading machine, disintegrator, edge runner, or similar machine), with cooling. The kneading takes place in the presence of air so that during 4 hours of kneading 40 to 60 parts of water are absorbed. A further 60 to 40 parts of water are then kneaded in so that the total amount of water added is 100 parts. Then the mass is heated in an autoclave with 160 to 250 parts of ethyl chloride for 6 to 24 hours at a temperature of 90 to 130° C. During the reaction the mass is either stirred or the autoclave is kept in motion. After cooling the autoclave is opened and emptied. The reaction product is placed on a filter and thoroughly washed, the precipitate mixed with dilute sulfuric acid and allowed to stand for a longer or shorter time, filtered and again thoroughly washed and then dried.

The resulting product is about 100 parts of a coarse, sandy powder which readily dissolves in many organic solvents (such as for instance benzol, alcohol, benzol-alcohol mixture, chloroform, chloroform-methyl-alcohol mixture, methyl acetate, glacial acetic acid, etc.,) the solutions (even without filtration) on evaporating leave clear, fibre-free, water-resistant and flexible films.

II.

Process as in Example I with the difference that the alkali cellulose is not dried to a constant weight but only until the water content amounts to 50 to 60 parts and accordingly only 50 to 40 parts of water are added during or after the incorporation of the solid caustic alkali instead of 100 parts.

III.

Process as in Example I except that the alkali cellulose is only pressed down to 300 to 360 parts. In this case instead of kneading in 100 to 125 parts of solid caustic soda only 80 to 120 are used. No water need be added.

The production and separation of the finished ethyl cellulose proceeds as in Example I.

IV.

100 parts of sulfite cellulose are soaked with 900 to 1000 parts of a 15 to 18% caustic alkali solution and allowed to stand for 24 to 48 hours and then pressed to 200 to 250 parts. The mass is then comminuted and after a longer or shorter storage (e. g. 3 hours to 3 days) is dried in a vacuum to a constant weight. The dried soda cellulose tests 1 to 5% water. The mass may stand for longer or shorter time and then 33 to 42 parts of powdered caustic soda is thoroughly rubbed in, with cooling, by means of a suitable apparatus. Then the material is heated with 100 parts of ethyl chloride in an autoclave for 10 to 12 hours at 90 to 100° C. The mass should preferably be stirred during the reaction or the autoclave kept in motion. After it has cooled the autoclave is opened and the contents placed in a mixing or kneading apparatus and 60 parts of powdered caustic soda is mixed in until homogeneous. The resulting product is again placed in the autoclave, 100 parts of ethyl chloride are added and the whole is heated for 10 to 20 hours at 90 to 130° C. with constant stirring or movement of the autoclave.

The separation is the same as in Example I and the properties of product also correspond.

The expression "etherification" in the claims covers alkylation and aralkylation. "ether" covers alkyl or aralkyl ether, "etherifying agent" covers alkylating and aralkylating agent.

The term "low water content" in the claims includes complete absence of water as well as the presence of a small amount of water. Under the expression "solid caustic alkalies" not only solid alkalies alone are understood, but also mixtures of solid alkalies and saturated caustic alkali solutions.

I claim:

1. The process of preparing low water content alkali cellulose, which process comprises treating an alkali cellulose obtained by evaporating water from an alkali cellulose containing more water than alkali, with solid caustic alkalies.

2. The process of preparing low water content alkali celluloses which comprises evaporating water from the alkali cellulose and then treating it with solid caustic alkalies.

3. The process of preparing low water content alkali celluloses which comprises treating cellulose with alkali solution less than one half saturated, evaporating water from the resulting product and treating it with solid caustic alkalies.

4. The process of preparing low water content alkali celluloses which comprises soaking cellulose in an excess of dilute alkali solution, removing a portion of the alkali solution, evaporating water from the residue and treating it with solid caustic alkalies.

5. A process according to claim 1, characterized by the fact that the evaporating of the water from the alkali cellulose is carried out at a pressure below atmospheric.

6. A process of preparing low water content alkali celluloses, which comprises treating cellulose with alkali solution of not substantially over 18% strength, drying the resulting product in vacuo and treating it with a solid caustic alkali.

7. The process of preparing low water content alkali celluloses, which comprises impregnating cellulose with an alkali solution, in excess, which is far below saturation, removing a portion of the alkali solution, drying the residue in vacuo and treating it with solid caustic alkali.

8. A process of preparing cellulose ethers which comprises treating alkali cellulose containing not over 60 parts of water to 100 parts of cellulose with solid caustic alkalies and acting on the resulting product with etherifying agents.

9. A process of preparing cellulose ethers which comprises evaporating water from alkali cellulose, treating it with solid caustic alkalies and acting on the resulting product with etherifying agents.

10. A process of preparing cellulose ethers which comprises treating cellulose with alkali solution of a concentration sufficiently low to permit evaporation of water therefrom without injury to the cellulose molecule, evaporating water from the resulting product, treating it with solid caustic alkalies and acting on the resulting product with etherifying agents.

11. A process of preparing cellulose ethers, which comprises impregnating cellulose with a relatively dilute alkali solution in excess, removing a portion of the solution, evaporating water from the residue, treating it with solid caustic alkali and acting on the resulting product with an etherifying agent.

12. A modification of the process according to claim 11 which consists in carrying out the step of evaporating water in a vacuum.

13. A process of preparing cellulose ethers which comprises treating cellulose with alkali solution corresponding to not substantially over 18% strength, drying the resulting product in vacuo, treating it with solid caustic alkali and acting on the resulting product with etherifying agents.

14. A process of preparing cellulose ethers which comprises impregnating cellulose with an alkali solution in excess, which solution is less than half saturated, removing a portion of the solution, drying the residue in vacuo, treating it with solid caustic alkali and acting on the resulting product with etherifying agents.

15. Alkali cellulose from which excess of water has been removed by evaporation at a pressure substantially below atmospheric.

In testimony whereof I affix my signature.

LEON LILIENFELD.